(12) United States Patent
Parenti

(10) Patent No.: US 7,836,618 B1
(45) Date of Patent: Nov. 23, 2010

(54) LICENSE PLATE SECURITY FRAME

(76) Inventor: Steve Parenti, 36425 Newark Blvd., Newark, CA (US) 94560

( * ) Notice: Subject to any disclaimer, the term of this patent is extended or adjusted under 35 U.S.C. 154(b) by 19 days.

(21) Appl. No.: 12/384,386

(22) Filed: Apr. 3, 2009

(51) Int. Cl.
*G07F 7/00* (2006.01)

(52) U.S. Cl. .............................. 40/209; 40/210; 40/201

(58) Field of Classification Search .................. 40/209, 40/207, 201, 202, 712
See application file for complete search history.

(56) References Cited

U.S. PATENT DOCUMENTS

| | | | | |
|---|---|---|---|---|
| 1,573,113 A | * | 2/1926 | Irie | 40/201 |
| 2,156,806 A | * | 5/1939 | Ducey | 40/200 |
| 2,710,475 A | * | 6/1955 | Salzmann | 40/202 |
| 3,432,954 A | * | 3/1969 | Ford | 40/202 |
| D412,876 S | * | 8/1999 | Crecelius | D12/193 |
| 6,305,107 B1 | | 10/2001 | Parenti | |
| 6,892,483 B2 | | 5/2005 | Parenti | |

* cited by examiner

*Primary Examiner*—Cassandra Davis
(74) *Attorney, Agent, or Firm*—Robert Charles Hill

(57) ABSTRACT

A license plate security frame comprises a solid inner back plate that is secured to a vehicle and a outer front rim hinged to it that traps the license plate and covers the mounting screws. Hinges at the bottom allow the inner back plate and outer front rim to open like a clamshell, and a cylinder lock mounted at the top to the outer front rim engages a lock pin mounted to the inner back plate. Clear corner covers are included to protect any stickers on the caged-in license plate, and are attached inside the outer front rim in the appropriate corners. The main surface of the license plate including the license numbers and their background are exposed through the middle of the outer front rim.

6 Claims, 3 Drawing Sheets

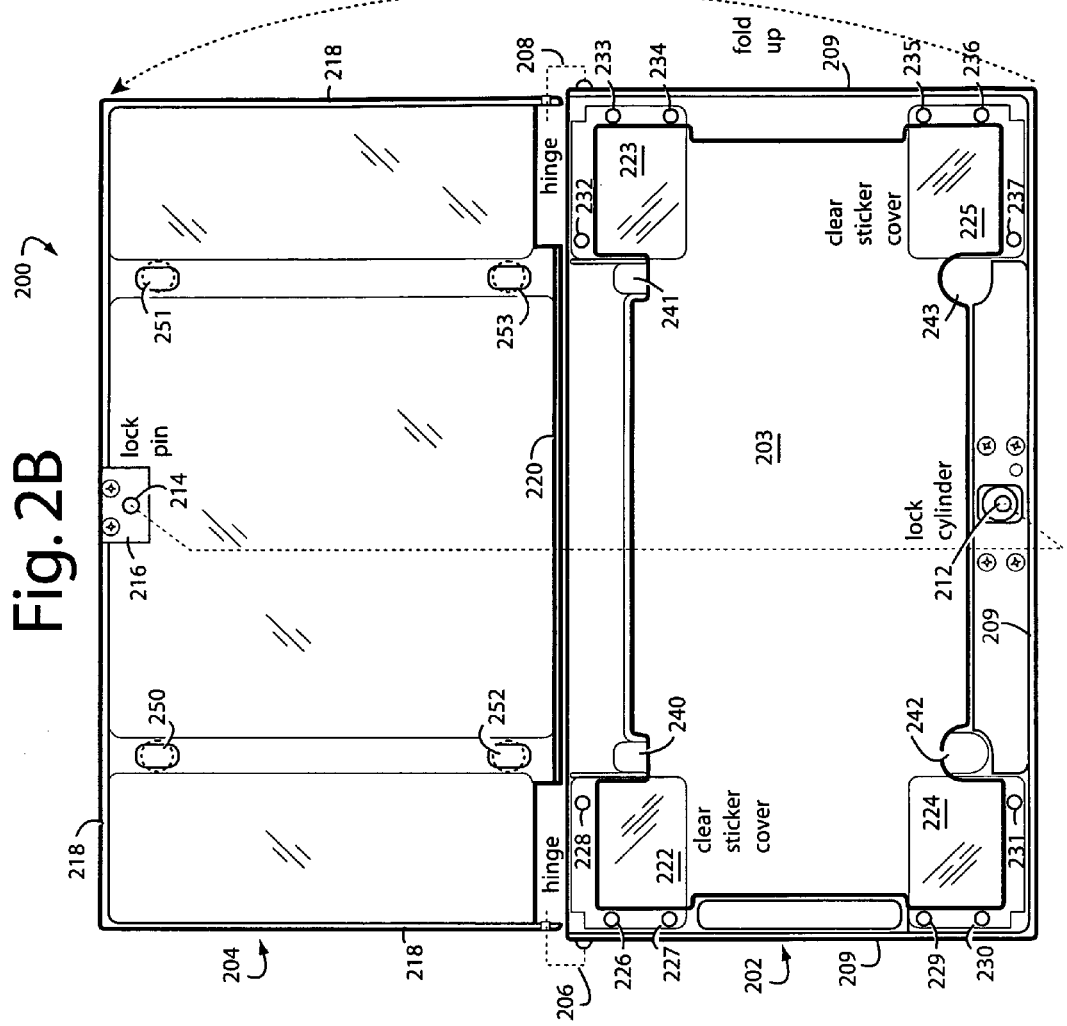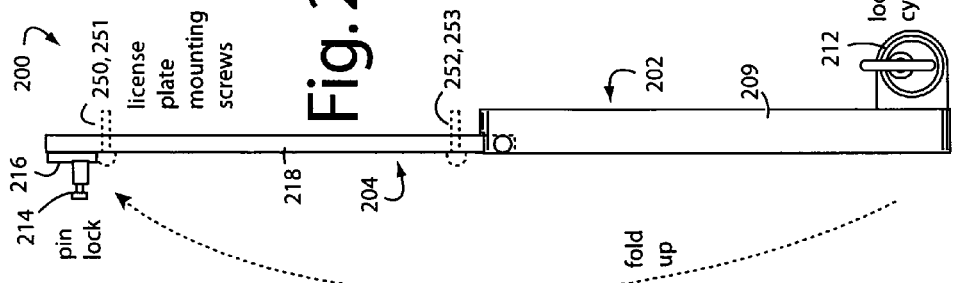

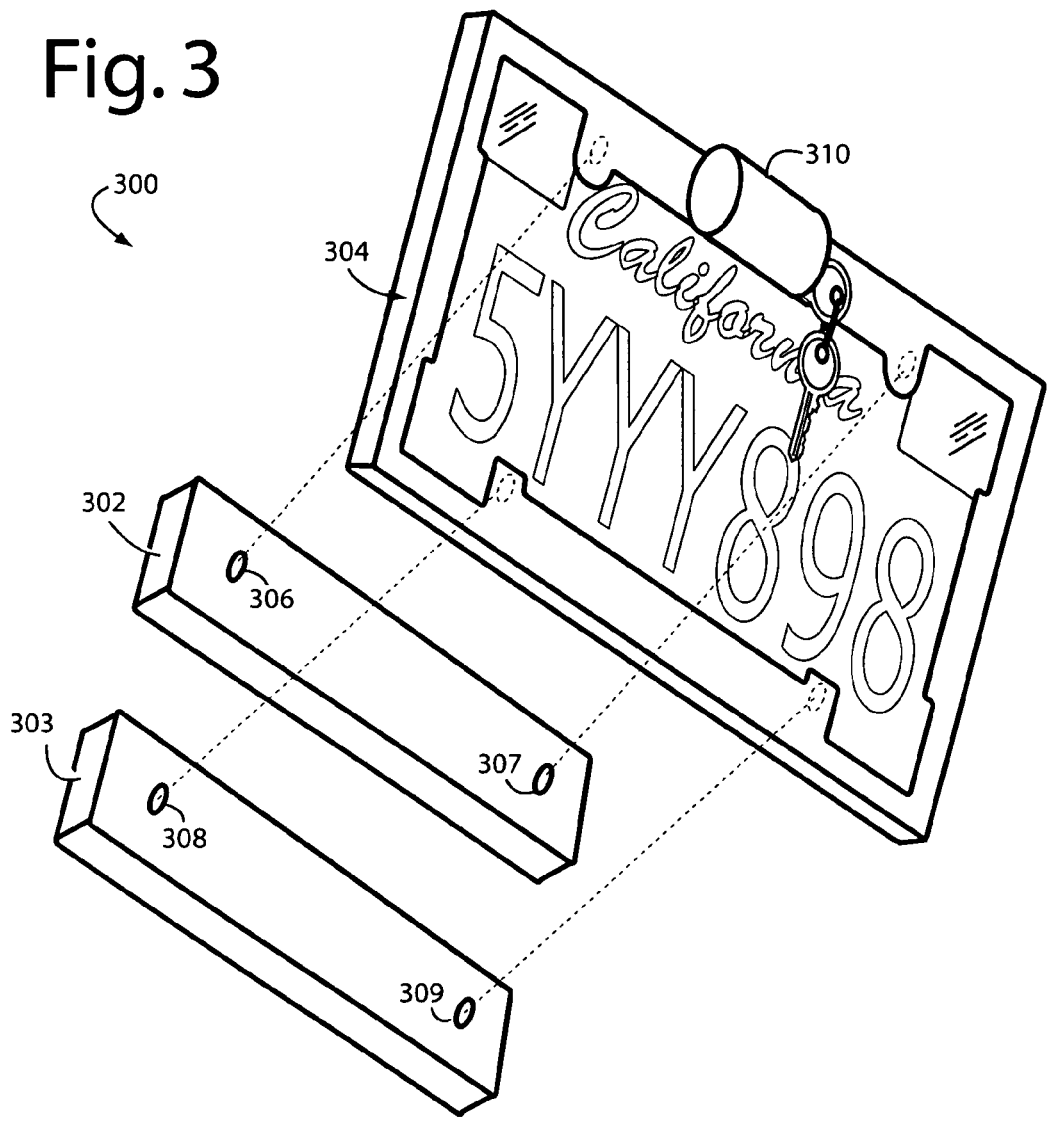

LICENSE PLATE SECURITY FRAME

BACKGROUND OF THE INVENTION

1. Field of the Invention

The present invention relates to vehicle license plate holders, and in particular to locking devices and shields that protect against theft of the annual renewal stickers in the corners and the whole license plate.

2. Description of the Prior Art

License plate and registration sticker theft is becoming more rampant and widespread. Simple screws are usually used to secure license plates to cars and so they are quick and easy to remove. Thieves and other criminals often steal license plates and use them on their cars in the commission of other crimes, and petty thefts of the stickers is common by people who haven't paid their own annual renewal fees.

One particular problem has been the use of stolen license plates by gas thieves who drive into filling stations, fill up, and drive away without paying. If the license number is reported, the police will be looking for the wrong car owner, e.g., the first victim.

The victims of these crimes are often unaware of the theft until a traffic officer stops them and cites them. Replacing the missing licenses and tags requires more fees to be paid and a trip to the DMV offices. Such offices are usually quite distant, have long waiting lines, and their business hours coincide with the victim's job shift. Getting cited means paying fines and making court appearances.

A few companies are marketing products intended to help protect license plates from damage and theft. For example, see www.platemate-enterprises.com. The present inventor, Steve Parenti describes a license plate lock in U.S. Pat. No. 6,305,107, issued Oct. 23, 2001, and a reversible locking license plate and registration sticker protection frame in U.S. Pat. No. 6,892,483, issued May 17, 2005.

Some of the prior art products being marketed commercially in the United States include plastic sheet to cover the entire license plate. But many States have made covering their license plates or coating them illegal because these treatments can interfere with the reflective qualities and how well traffic enforcement cameras can image the license numbers. These products also use simple key locks that are relatively easy to break open.

What is needed is a license plate security frame that is strong, includes a high quality lock, and covers the mounting screws and stickers without covering the main surface that includes the license numbers and their background. The use of such a security frame should be acceptable in every State.

SUMMARY OF THE INVENTION

Briefly, a license plate security frame embodiment of the present invention comprises a solid inner back plate that is secured to a vehicle and a outer front rim hinged to it that traps the license plate and covers the mounting screws. Hinges at the bottom allow the inner back plate and outer front rim to open like a clamshell, and a cylinder lock mounted at the top to the outer front rim engages a lock pin mounted to the inner back plate. Clear corner covers to protect any stickers on the caged-in license plate are attached inside the outer front rim at the appropriate corners. The main surface of the license plate including the license numbers and their background are exposed through the middle of the outer front rim.

These and other objects and advantages of the present invention will no doubt become obvious to those of ordinary skill in the art after having read the following detailed description of the preferred embodiments which are illustrated in the various drawing figures.

IN THE DRAWINGS

FIG. 2A is side view diagram of a license plate security frame embodiment of the present invention fully open and ready to secure a license plate inside;

Figure 1:
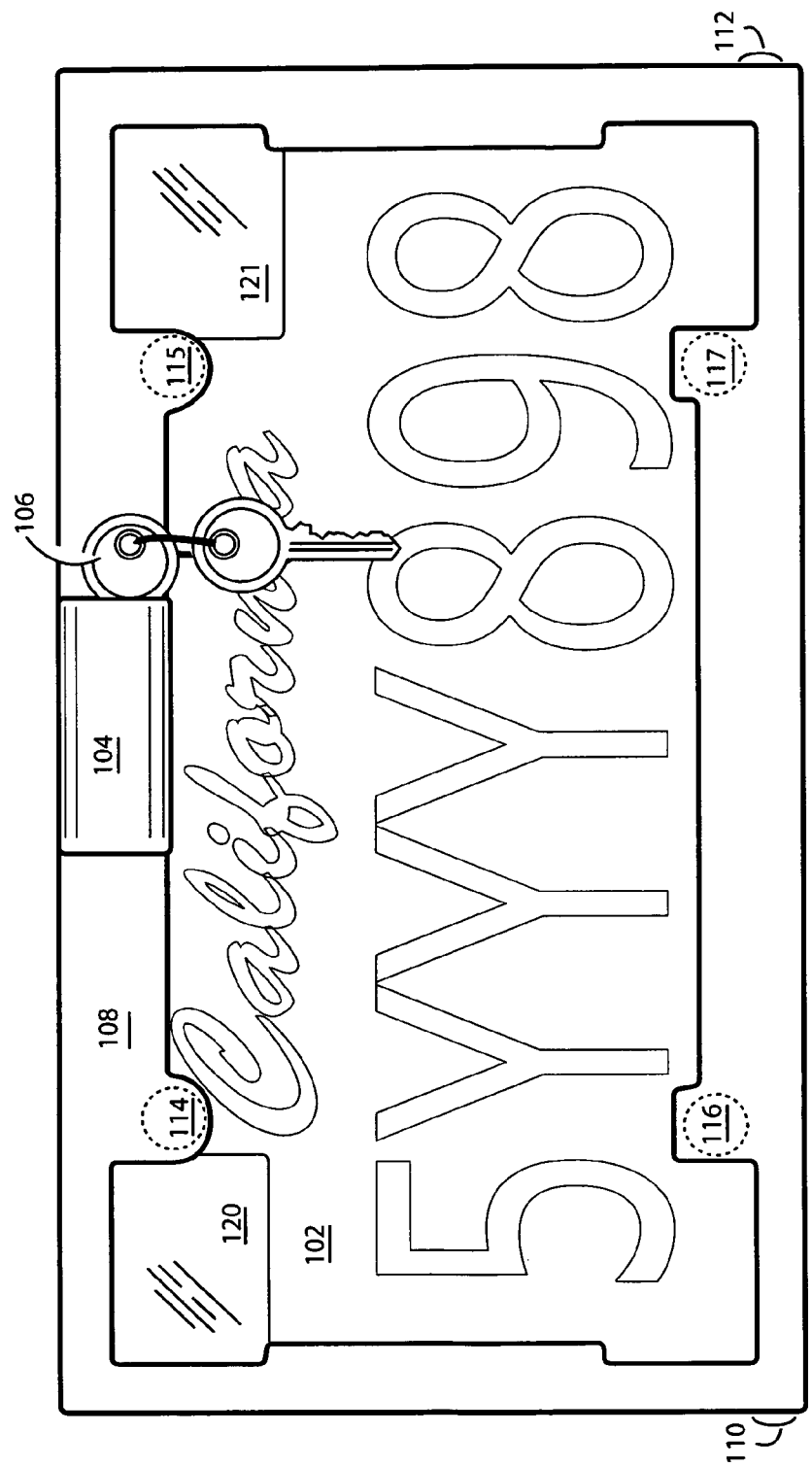
FIG. 1 is a outer front view diagram of a license plate security frame embodiment of the present invention with a typical license plate already locked inside.

FIG. 2B is outer front view diagram of the unlocked and open license plate security frame of FIG. 2A. Four clear sticker covers are shown mounted inside the outer front rim at all four corners, but only those actually needed would be installed by the user; and FIG. 3 is perspective view diagram of a license plate security frame and mounting bar that can be used for commercial vehicles where the nuts for the mounting screws would otherwise be exposed.

DETAILED DESCRIPTION OF THE PREFERRED EMBODIMENT

FIG. 1 represents a license plate security frame embodiment of the present invention, and is referred to herein by the general reference numeral 100. The license plate security frame 100 is intended to capture and secure a typical 12" by 6" vehicle license plate 102 as used in each of the States and Territories of the United States. It could be resized, of course, to fit the license plates of other countries.

License plate security frame 100 includes a cylinder lock 104 and keys 106 that secure an outer front rim 108 on hinges 110 and 112 to an inner back plate (not visible in FIG. 1). The outer front rim 108 is made of a tough ABS plastic or cast aluminum to resist bending and breaking, such as could occur during a thief's attempt to steal license plate 102. Integral extended bolt covers 114-117 molded into outer front rim 108 exclude tools from being able to access the bolt heads securing the assembly to a vehicle. Typically, these mounting bolts being secluded are on a rectangular 7" by 4¾" pattern.

Two clear registration sticker covers 120-121 are shown in the upper two corner positions. Such would be useful on a California type license plate 102 in which the annual registration month and year stickers are placed in the upper left and right. Other states may use one or both of the lower two corners. These clear registration sticker covers 120-121 are a tough plastic sheet that will resist bending or breaking, and deter a thief from being able to remove the stickers. For example, acrylic or polycarbonate could be used. At a minimum, the interference afforded by these covers will prevent a successful attempt to remove the sticker whole. That prospect would be obvious and enough of a deterrence to be beneficial to the user.

FIGS. 2A-2B represents side and outer front views of a license plate security frame embodiment of the present invention, and the assembly is referred to herein by the general reference numeral 200. Assembly 200 includes an outer front rim 202 with a middle open area 203 to expose a complete license number appearing on the surface of a vehicle license plate, as seen in FIG. 1. The outer front rim 202 opens and closes over and around an inner back plate 204 on two collinear hinges 206 and 208. Screws, bolts, rivets, and clevis pins can all be used for hinges 206 and 208.

The outer front rim 202 is dished with a perimeter lip 209, which is much deeper than the inner back plate 204, and lip 209 slightly larger in perimeter. In the closed position, the relative dimensions and the locations of the hinges 206 and 208 allow the outer front rim 202 to fully engulf the inner back plate 204 when they are closed together like a clamshell.

A cylinder lock 212 engages a lock pin 214 that sticks out from a cantilever plate 216. The cantilever plate type mounting for lock pin 214 is needed so a typical license plate can be nested inside a protruding lip 218 on three sides and a lip 220 at the bottom of inner back plate 204.

Four clear registration sticker covers 222-225 are shown in the upper and lower, left and right corner positions. A notch may be included to clear hinges 206 and 208. These clear registration sticker covers 222-225 are interchangeable and removable by the user and snap onto pegs 226-237. Fewer or more pegs than are illustrated could be used as necessary, and not only in the four corner areas.

Each round peg is typically 1/8" tall and also in diameter. Square pegs or slots could also be used, but the type here has provided acceptable results. Clear polycarbonate sheet 1/8" thick is a good material to use for covers 222-225. Integral extended bolt covers 240-243 are molded into the outer front rim 202. They seclude the heads of mounting screws 250-253 that secure the assembly to a vehicle. The extended bolt covers 240-243 are positioned to exclude tools from being able to access the heads of mounting screws 250-253. Cast aluminum will produce good results if used to fabricate outer front rim 202 and inner back plate 204. Such can be painted or anodized black for a good appearance.

The sideways mounting of cylindrical lock 104 and 212 (FIGS. 1, 2A, and 2B) help protect it from road debris and attempts at theft because it is not so exposed as in conventional security frames. Opening up to place new stickers is especially easy and quick with the configuration described here. This type of lock can be snapped closed without using the key.

FIG. 3 represents a commercial vehicle installation 300 in which a flat back bar 302 and 303 are provided for the secure attachment of a license plate security frame assembly 304 to the fender of a truck or other commercial vehicle. Each bar 302, 303 is drilled and tapped at 306-309 for the license plate mounting bolts that pass through a fender. Each bar 302, 303 replaces the two nuts that would otherwise be exposed under the fender and easily removed.

A method embodiment of the present invention for securing a vehicle license plate includes nesting a vehicle license plate between a front rim and an inner back plate. Then positioning a lock and hinges on the front rim and inner back plate such that they can be opened to allow removal and insertion of the vehicle license plate, and to secure it when closed. Portions of the front rim are extended to cover mounting screws for the vehicle license plate that would otherwise be exposed, but allowing access to them when the lock is opened. Clear plastic covers are placed in the corners of a middle open area of the front rim to coincide with areas reserved for any registration stickers that may be applied to the vehicle license plate. The relative dimensions and shapes of the front rim and inner back plate, and the placement of the hinge are such that the inner back plate and said vehicle license plate can be folded inside the front rim and the mounting screws and any registration stickers in the corners of the vehicle license plate will not be directly exposed to attempts at theft.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A license plate flame, comprising: an inner back plate sized to fit a vehicle license plate, and including a set of holes for mounting screws that match those also provided in said vehicle license plate;
   an outer front rim sized to fit the inner back plate, and having a middle open area to expose a complete license number appearing on the surface of said vehicle license plate;
   a hinge attached to both the front rim and inner back plate such that they can open and close like a clamshell;
   a lock attached to the front rim and inner back plate such that said vehicle license plate can be secured within;
   a set of extended bolt covers included with the front rim that intrude into said middle open area and seclude the otherwise exposed heads of said mounting screws; and
   a plurality of mounting pegs arranged inside and behind the front rim in the corner areas, and providing for attachment a clear cover mounted to an inside corner of said middle open area that coincides with an area reserved for registration stickers that are applied to said vehicle license plate;
   wherein, the combination deter and impede any attempted theft of said vehicle license plate mounted to a vehicle.

2. The license plate security frame of claim 1, further comprising:
   a perimeter lip protruding from the inner back plate toward the front rim, and providing for a nesting of said vehicle license plate.

3. The license plate security frame of claim 1, further comprising:
   a locking pin extending from the inner back plate toward the front rim, and positioned to engage the lock when closed and secured.

4. The license plate security frame of claim 1, further comprising:
   a perimeter lip protruding from the inner back plate toward the front rim, and providing for a nesting of said vehicle license plate;
   a locking pin extending from the inner back plate toward the front rim, and positioned to engage the lock when closed and secured; and
   a cantilever mount for supporting the locking pin, and attached to the perimeter lip such that said vehicle license plate can be tucked underneath to nest within the perimeter lip.

5. The license plate security frame of claim 1, where the relative dimensions and shapes of the front rim and inner back plate, and the placement of the hinge are such that the inner back plate and said vehicle license plate can be folded inside the front rim and the mounting screws and any registration stickers in the corners of the vehicle license plate will not be directly exposed to attempts at theft.

6. A license plate security frame, comprising:
   an inner back plate sized to fit a vehicle license plate, and including a set of holes for mounting screws that match those also provided in said vehicle license plate;
   an outer front rim sized to fit the inner back plate, and having a middle open area to expose a complete license number appearing on the surface of said vehicle license plate;
   a hinge attached to both the front rim and inner back plate such that they can open and close like a clamshell;

a lock attached to the front rim and inner back plate such that said vehicle license plate can be secured within;

a set of extended bolt covers included with the front rim that intrude into said middle open area and seclude the otherwise exposed heads of said mounting screws;

a set of four clear plastic covers for mounting to the inside corners of said middle open area that coincide with areas reserved for registration stickers that can be applied to said vehicle license plate; and a number of mounting pegs arranged inside and behind the front rim in the corner areas, and providing for attachment the clear plastic covers;

wherein, the combination deter and impede any attempted theft of said vehicle license plate mounted to a vehicle and a user can install or remove individual ones on the clear plastic covers according to the particular vehicle license plate and registration stickers being used.

* * * * *